US009937468B2

(12) United States Patent
Pavan et al.

(10) Patent No.: US 9,937,468 B2
(45) Date of Patent: Apr. 10, 2018

(54) METHODS OF OPERATING A MEMBRANE SEPARATION DEVICE, CONTROL DEVICES FOR A MEMBRANE SEPARATION DEVICE AND DEVICES THAT OPERATE A MEMBRANE SEPARATION DEVICE

(71) Applicant: BWT Aktiengesellschaft, Mondsee (AT)

(72) Inventors: Andrea Pavan, Cittadella (IT); Jürgen Johann, Nussloch (DE); Marc Fink, Lorrach (DE)

(73) Assignee: BWT Aktiengesellschaft (AT)

( * ) Notice: Subject to any disclaimer, the term of this patent is extended or adjusted under 35 U.S.C. 154(b) by 878 days.

(21) Appl. No.: 13/799,761

(22) Filed: Mar. 13, 2013

(65) Prior Publication Data
US 2013/0240446 A1 Sep. 19, 2013

(30) Foreign Application Priority Data
Mar. 14, 2012 (DE) .................. 10 2012 204 011

(51) Int. Cl.
*B01D 61/12* (2006.01)
*C02F 1/44* (2006.01)
(Continued)

(52) U.S. Cl.
CPC ............ *B01D 61/12* (2013.01); *B01D 61/22* (2013.01); *C02F 1/441* (2013.01); *C02F 1/442* (2013.01);
(Continued)

(58) Field of Classification Search
CPC .. B01D 27/108; B01D 29/603; B01D 29/606; B01D 33/806; B01D 33/808;
(Continued)

(56) References Cited

U.S. PATENT DOCUMENTS 6,190,558 B1 * 2/2001 Robbins ............... B01D 61/025
210/134
2004/0149637 A1 8/2004 Valbjoern et al.
(Continued)

FOREIGN PATENT DOCUMENTS

DE 25 33 151 2/1976
DE 25 33 151 A1 2/1976
(Continued)

OTHER PUBLICATIONS

English language machine translation of EP0599281, No Date, 17 Pages.*

*Primary Examiner* — Pranav N Patel
(74) *Attorney, Agent, or Firm* — DLA Piper LLP (US)

(57) ABSTRACT

A method of operating a membrane separation device in a continuous flow process includes in the membrane separation device, separating a supply liquid into a first partial stream and a second partial stream, wherein flow rate of the second partial stream and/or recovery rate of the second partial stream is influenced by at least one influencing variable that varies during operation, and varying the flow rate of the first partial stream to compensate for a change of the at least one influencing variable to control flow rate and/or recovery rate of the second partial stream to a preset value.

8 Claims, 3 Drawing Sheets

(51) Int. Cl.
  *B01D 61/22* (2006.01)
  *C02F 1/00* (2006.01)
(52) U.S. Cl.
  CPC .......... *C02F 1/444* (2013.01); *B01D 2311/16* (2013.01); *B01D 2311/165* (2013.01); *B01D 2313/18* (2013.01); *C02F 1/008* (2013.01); *C02F 2209/40* (2013.01)
(58) Field of Classification Search
  CPC .............. B01D 35/1475; B01D 35/157; B01D 35/1573; B01D 35/1576; B01D 37/043; B01D 37/046; B01D 46/444; B01D 46/448; B01D 61/12; B01D 61/22; B01D 61/32; B01D 2201/165; B01D 2311/14; B01D 2311/16
  See application file for complete search history.

(56) References Cited

U.S. PATENT DOCUMENTS

| | | |
|---|---|---|
| 2007/0295650 A1 | 12/2007 | Yoneda et al. |
| 2009/0008931 A1* | 1/2009 | Kloos et al. ................ 285/91 |
| 2009/0045144 A1 | 2/2009 | Cohen et al. |
| 2009/0120873 A1* | 5/2009 | Becker .................. B01D 61/14 210/636 |
| 2011/0315632 A1* | 12/2011 | Freije, III .............. B01D 61/12 210/636 |

FOREIGN PATENT DOCUMENTS

| | | |
|---|---|---|
| DE | 31 06 772 | 9/1982 |
| DE | 42 39 867 C2 | 6/1994 |
| DE | 43 31 102 | 3/1995 |
| DE | 195 20 914 | 6/1996 |
| DE | 299 07 813 | 8/1999 |
| DE | 299 07 813 U1 | 8/1999 |
| DE | 10 2008 037 118 B4 | 2/2010 |
| DE | 10 2009 031 043 A1 | 1/2011 |
| DE | 10 2009 040 049 A1 | 3/2011 |
| EP | 0 394 777 | 10/1990 |
| EP | 0 599 281 | 6/1994 |
| EP | 0 676 374 A2 | 10/1995 |
| EP | 1 440 726 | 7/2004 |

* cited by examiner

METHODS OF OPERATING A MEMBRANE SEPARATION DEVICE, CONTROL DEVICES FOR A MEMBRANE SEPARATION DEVICE AND DEVICES THAT OPERATE A MEMBRANE SEPARATION DEVICE

RELATED APPLICATION

This application claims priority of German Patent Application No. 10 2012 204 011.0, filed Mar. 14, 2012, the subject matter of which is incorporated herein by reference.

TECHNICAL FIELD

This disclosure relates to methods of operating a membrane separation device, control devices for a membrane separation device and devices that operate a membrane separation device in a continuous flow process.

The term "membrane separation device" refers to a separation device by means of which an supply liquid, also referred to as feed, inflow or feed water, is separated into a concentrate (or retentate) and a permeate by a membrane. The related method is referred to as membrane separation method or membrane method.

BACKGROUND

The membrane separation methods include reverse osmosis as well as ultrafiltration, nanofiltration and hyperfiltration, where required also in a combination.

Membrane separation methods are, for example, employed for treatment of water, in particular for desalination of water. Nowadays, the treatment of water becomes increasingly important. Besides a treatment of water to obtain potable water, high-purity process waters are required in particular in the chemical and pharmaceutical industries and need to be prepared on a large scale and as cost-efficiently as possible. Furthermore, high-purity water is also required in the semiconductor industry, for example, to rinse silicon wafers, in particular after etching processes. Generally, the requirements regarding water purity are very high in that field.

The membrane separation method can be combined with other methods of pre-treating the supply liquid and/or post-treating the permeate and/or the concentrate. For example, it is known to further supplement such a procedure by a degassing step prior to or subsequent to the membrane separation method if relatively large amounts of dissolved carbon dioxide are present in a raw water used as supply liquid.

With the membrane separation method and/or the membrane separation device, a feed stream of the liquid to be treated is separated into two partial streams, namely a concentrate and a permeate. The amount of permeate is referred to as permeate capacity or shortly capacity of the membrane separation device. The ratio of the partial streams to one another is referred to as recovery rate or conversion rate. In particular, the ratio between the volumetric flow rate of the permeate (permeate flow rate) and the volumetric flow rate of the concentrate (concentrate flow rate) is referred to as permeate recovery rate.

Due to changes in influencing variables such as age-related changes of permeability of membranes, pressure fluctuations, temperature fluctuations and/or concentration fluctuations of the supply liquid, there may occur changes in the permeate capacity and/or the permeate recovery rate during operation of a membrane separation device without change of the operating parameters.

It could therefore be helpful to provide methods of operating a membrane separation device, control devices for a membrane separation device and devices that operate a membrane separation device in a continuous flow process, wherein such changes in influencing variables can be compensated.

SUMMARY

We provide a method of operating a membrane separation device in a continuous flow process including in the membrane separation device, separating a supply liquid into a first partial stream and a second partial stream, wherein flow rate of the second partial stream and/or recovery rate of the second partial stream is influenced by at least one influencing variable that varies during operation, and varying the flow rate of the first partial stream to compensate for a change of the at least one influencing variable to control flow rate and/or recovery rate of the second partial stream to a preset value.

We also provide a control device for a membrane separation device operated in a continuous flow process, wherein a supply liquid can be separated into a first partial stream and a second partial stream, a flow rate of the second partial stream and/or a recovery rate of the second partial stream is influenced by at least one influencing variable that varies during operation, and to compensate for a change of the at least one influencing variable, the control device includes a controller unit that generates a control signal that varies flow rate of the first partial stream to control a flow rate and/or a recovery rate of the second partial stream to a preset value.

We further provide a device for operating a membrane separation device in a continuous flow process, wherein, in the membrane separation device a supply liquid can be separated into a first partial stream and a second partial stream, a flow rate of the second partial stream and/or a recovery rate of the second partial stream being influenced by at least one influencing variable that varies during operation, including a base body having at least one first channel, wherein the first partial stream can flow through the first channel, and a control device, wherein, to compensate for a change of the at least one influencing variable, the control device includes a controller unit that generates a control signal that varies a flow rate of the first partial stream to control flow rate and/or a recovery rate of the second partial stream to a preset value.

DETAILED DESCRIPTION

Figure 1:
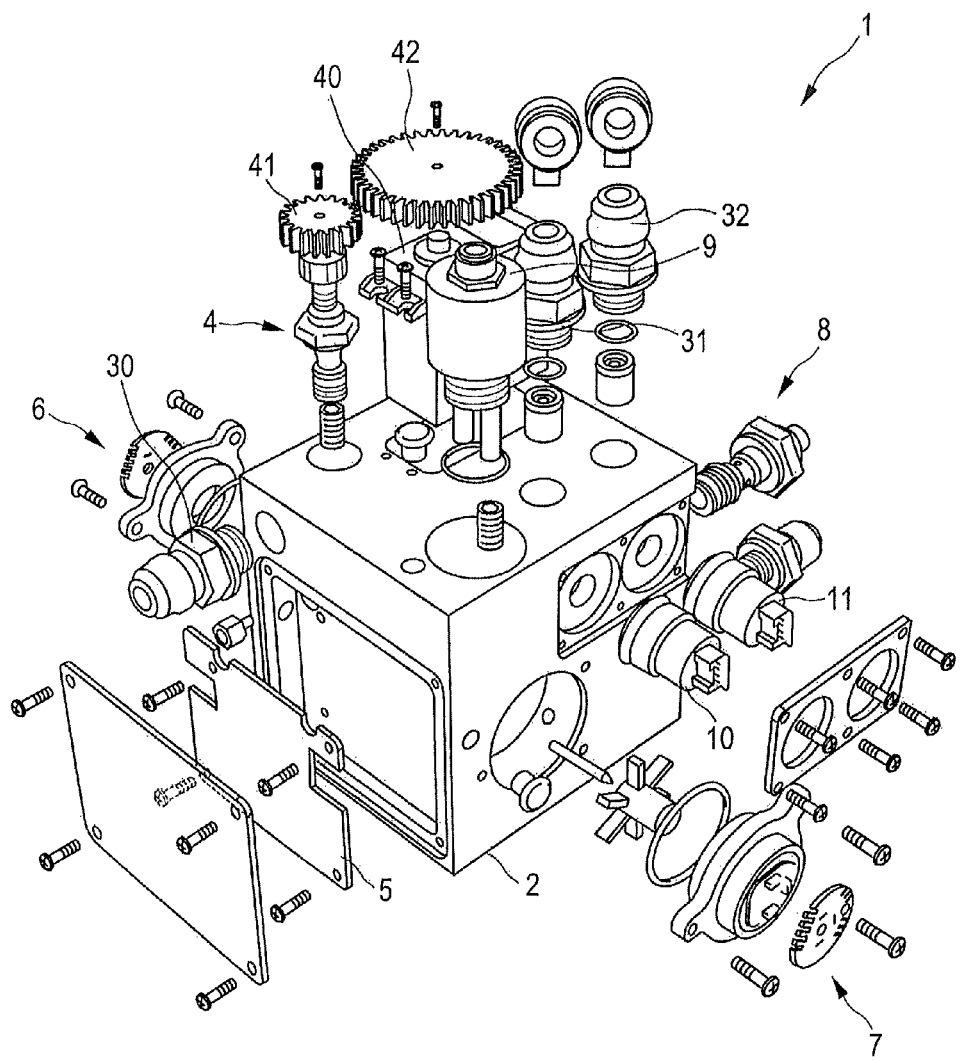
FIG. 1 shows an exploded view of an example of our device.

It will be appreciated that the following description is intended to refer to specific examples of structure selected for illustration in the drawings and is not intended to define or limit the disclosure, other than in the appended claims.

We provide methods of operating a membrane separation device in a continuous flow process, wherein, in the membrane separation device, a supply liquid is separated into a first partial stream and a second partial stream, the flow rate of the second partial stream and/or the recovery rate of the second partial stream being influenced by at least one influencing variable that varies during operation, and wherein the flow rate of the first partial stream is varied to compensate for a change in the at least one influencing variable to control the flow rate and/or recovery rate of the second partial stream to a preset value.

In a membrane separation method, the partial streams are a permeate stream and a concentrate stream, abbreviated as permeate and concentrate.

The flow rate of a partial stream, i.e., of the concentrate stream or of the permeate stream, is defined as the amount, i.e., the volume or mass, of the concentrate or the permeate per unit time. Preferably, the flow rate is defined as a volumetric flow rate, i.e., the volume per unit time. A ratio between the flow rate of the second partial stream and the flow rate of the first partial stream is referred to as recovery rate of the second partial stream or conversion rate of the second partial stream. The flow rate of the permeate and the flow rate of the concentrate are interdependent due to the mass flow rate balance and the volumetric flow rate balance.

The flow rate of the permeate may be varied to control the flow rate of the concentrate and/or the concentrate recovery rate to a preset value. The flow rate of the concentrate may be varied to control the flow rate of the permeate and/or the permeate recovery rate to a preset value.

Thus, by variation of the flow rate of the concentrate, the permeate flow rate, the permeate capacity and/or the permeate recovery rate can be controlled to a constant or essentially constant preset value under compensation of external influences. In particular under compensation of influencing variables such as age-related changes of permeability of membranes, pressure fluctuations, temperature fluctuations and/or concentration fluctuations of the supply liquid.

The term "control" is used to describe an open-loop control and/or a closed-loop control.

A change of at least one input parameter of a system to achieve a change of at least one output parameter without any direct or indirect feedback of an actual output parameter for the determination of the at least one input parameter, is referred to as open-loop control or non-feedback control. A change in a permeability of an employed membrane over a time of operation, which change is known from comparative measurements or the like, may be compensated for a corresponding change in the flow rate of the concentrate over the time of operation without the necessity of additional sensor devices.

A change in at least one input parameter of the system under feedback of a measured parameter is referred to a closed-loop control. In this case, a control accuracy depends, among other factors, on a measuring accuracy of the parameters measured. With a closed-loop control, variations of influencing variables can be compensated for without further knowledge of the influencing variables themselves. For example, a change in a permeability of an employed membrane and the impact of the change in a permeability on the permeate recovery rate, which are not known in advance, can be compensated for by varying the flow rate of the concentrate.

At least the flow rate of one partial stream may be detected by at least one sensor device. Preferably, the flow rate of both partial streams is detected, each by a sensor device.

The detected flow rate, in particular a volumetric flow rate of one of the two partial streams, can be compared to a desired value and to reach the desired value the flow rate can be altered directly using a control element or indirectly by variation of the other of the two partial streams. The volumetric flow rate of the concentrate may be detected by a first sensor device. The detected actual value of the flow rate of the concentrate can be compared to a desired value and the flow rate of the concentrate can be altered to reach the desired value. Thereby, the permeate capacity is indirectly controlled. Alternatively or additionally, the flow rate, in particular the volumetric flow rate, of the permeate may be detected by a second sensor device. The detected actual value of the flow rate of the permeate can be compared to a preset value and, to reach or maintain the preset value, the flow rate of the concentrate can be altered. By detecting the volumetric flow rate of the permeate and the concentrate, the permeate recovery rate, also referred to as Water Conversion Factor (WCF), can be detected and the flow rate of the concentrate can be altered to reach a desired value of the permeate recovery rate.

The permeate recovery rate also depends on the purity or quality of the supply liquid, also referred to as raw water quality, and/or on a pretreatment of the supply liquid. Therefore, by controlling the permeate recovery rate to a preset value, an adjustment of the permeate recovery rate to a previously not known quality of the supply liquid at an installation site of the membrane separation device within the scope of the measuring parameter accuracy is possible.

Variation of the flow rate of the first partial stream can be achieved manually, e.g., through a maintenance operator. To this end, a user can be supported acoustically and/or optically in the variation by corresponding indicator elements.

The flow rate of the first partial stream may be varied by an actuable element, in particular by an actuable valve. As a result, an adjustment is possible without manual interventions.

The permeate and/or the concentrate obtained in the membrane separation device may be post-treated or recirculated.

We also provide control devices for a membrane separation device operated in a continuous flow process, wherein, in the membrane separation device, a supply liquid can be separated into a first partial stream and a second partial stream, the flow rate of the second partial stream and/or a recovery rate of the second partial stream being influenced by at least one influencing variable that varies during operation, and wherein to compensate for a change of the at least one influencing variable the control device comprises a controller unit that generates a control signal that varies the flow rate of the first partial stream to control the flow rate and/or recovery rate of the second partial stream to a preset value.

The term "controller unit" refers to an electronic unit with which control signals can be generated, in particular calculated, for open-loop controlling or closed-loop controlling a device assigned to the controller unit. For example, the controller unit can be configured as an integrated circuit or comprise an integrated circuit.

An assembly comprising a controller unit is referred to as control device, the control device configured to closed-loop control or open-loop control processes depending on the requirements of the operational area. Thus, the control device allows closed-loop controlling and/or open-loop controlling of volumetric flow rates or flow rate ratios to desired values according to a presetting.

A desired flow rate and/or a desired recovery rate for the second partial stream can be preset at the controller unit, at least within limit values depending on technical factors of the membrane separation device and the control signal for the first partial stream can be generated depending on the preset values.

At least one sensor device that detects the flow rate of at least one partial stream may be provided, preferably at least two sensor devices that detect the flow rate of the first and the second partial stream are provided. The first and/or the second sensor device are in each case suitably configured to detect the flow rate, in particular the volumetric flow rate. For each partial stream, one impeller water meter may be provided as a sensor device. Two sensor devices in different configuration may be provided for the first partial stream and the second partial stream.

The control signal can be output optically and/or acoustically on a user interface, and a user can manually make settings by means of the displayed control signal. An actuable element actuable with the control signal, in particular an actuable valve, may be provided to vary the flow rate of the first partial stream. The control signal generated by the control device is transmitted to the actuable element in a suitable wired or wireless manner. The control element is preferably configured as valve, in particular as needle valve. The flow rate can be set precisely with the valves.

Furthermore, we provide devices that operate a membrane separation device in a continuous flow process, wherein a supply liquid can be separated into a first partial stream and a second partial stream, the flow rate of the second partial stream and/or a recovery rate of the second partial stream being influenced by at least one influencing variable that varies during operation, the devices comprising a base body having at least one first channel, wherein the first partial stream can flow through the first channel, and a control device, wherein to compensate for a change of the at least one influencing variable the control device comprises a controller unit that generates a control signal that varies the flow rate of the first partial stream to control the flow rate and/or recovery rate of the second partial stream to a preset value.

The device can be mounted on a membrane separation device as a structural unit, for example, on a water treatment plant and/or a desalination plant and/or corresponding devices and/or can be fully or partially integrated therein. The base body comprises in the region of the first channel a fitting, by which a conduit, in particular a conduit of the concentrate, coming from the membrane separation device can be connected.

An actuable element, in particular an actuable valve, which can be actuated by the control signal may be provided to vary the first partial stream in the at least one first channel. The flow rate of the partial stream through the channel can be altered with the valve.

At least one sensor device that detects the flow rate of the first partial stream may be provided in the at least one first channel. The sensor device may comprise an impeller wheel arranged in the channel. The flow rate sensor operative according to another measuring principle may be provided as a sensor device. A detection device by an immediate volume meter, an ultrasonic through-flow sensor, a swirl through-flow sensor and/or a magnetic inductive through-flow sensor may be provided, for example.

The base body may comprise a second channel, wherein the second partial stream can flow through the second channel, and wherein at least a second sensor device that detects the flow rate of the second partial stream may be provided in the second channel. Therein, a compact structural unit may be provided by which the recovery rate of a second partial stream, in particular a permeate recovery rate, can be detected and controlled to a desired value by altering the flow rate of the first partial stream.

The second partial stream may be a permeate and the second channel comprises a first connection for the permeate, a second connection for the supply liquid and a mixing valve, in particular an actuable mixing valve. As a result, it is possible to blend the permeate for certain applications with the supply liquid. A check valve may be assigned to at least the first connection for permeate to prevent a return flow. In some cases, the mixing valve may be adjusted such that, in particular open-loop or closed-loop controlled situations, a blend of permeate and supply liquid conforms to certain desired values. Flow rates of the blend may be predefined as desired values. Properties of the blend, for example, concentration of a substance filtered-off may be predefined as a desired value. An adjustment of the mixing valve may be effected such that conductivity of the permeate, or, in the case of blending, conductivity of the blend, is closed-loop controlled or open-loop controlled to a desired value.

To at least one channel, preferably to the second channel, may be assigned an ion concentration sensor device that detects an ion concentration. Conductivity of a fluid depends, among other factors, on the ion concentration. As an ion concentration sensor device, a conductivity detector that determines ionic compounds is used by which conductivity of the partial stream can be detected. Detection of the ion concentration may be effected independent of blending of the permeate. Preferably, detection is effected downstream of the mixing valve.

To at least one channel, preferably to the second channel, may be assigned a pressure sensor device that detects pressure for pressure-dependent switching-on or switching-off the membrane separation device. Maintaining a pressure difference between the supply liquid and the permeate is mandatory to operate the membrane separation device. By detecting the pressure, a pressure-depending switching-on and switching-off of the membrane separation device is possible by use of our devices.

At least one user interface for entry and/or indication of preset and/or actual values regarding the first partial stream and/or the second partial stream may be provided. Thus, the user interface can facilitate a simple handling of the membrane separation device via the device. The user interface may be provided on the base body. The user interface may be connected to the base body for data exchange in a wired or wireless manner. The device may be used to control the permeate recovery rate under variation of the flow rate of the concentrate. Therein, a presetting of a desired value of the permeate recovery rate is effected directly via the user interface, for example, a device display. Besides the desired value, also, the current actual value is displayed on the device display. As a result, a user can be supported in a manual setting of the membrane separation device and/or an automatic setting of the membrane separation device can be monitored by a user.

Further advantages arise from the following description of examples which are schematically shown in the drawings. For like or similar components uniform reference numerals are used in the drawings.

Figure 2:
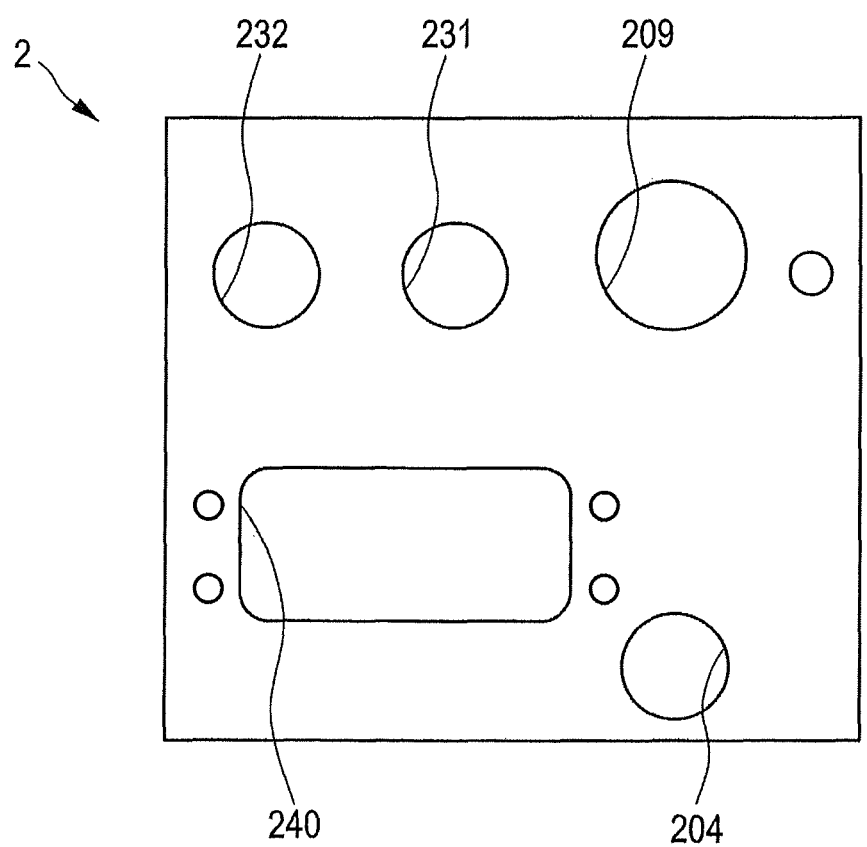
FIG. 2 shows a plan view of a base body of the device according to FIG. 1.
Figure 3:
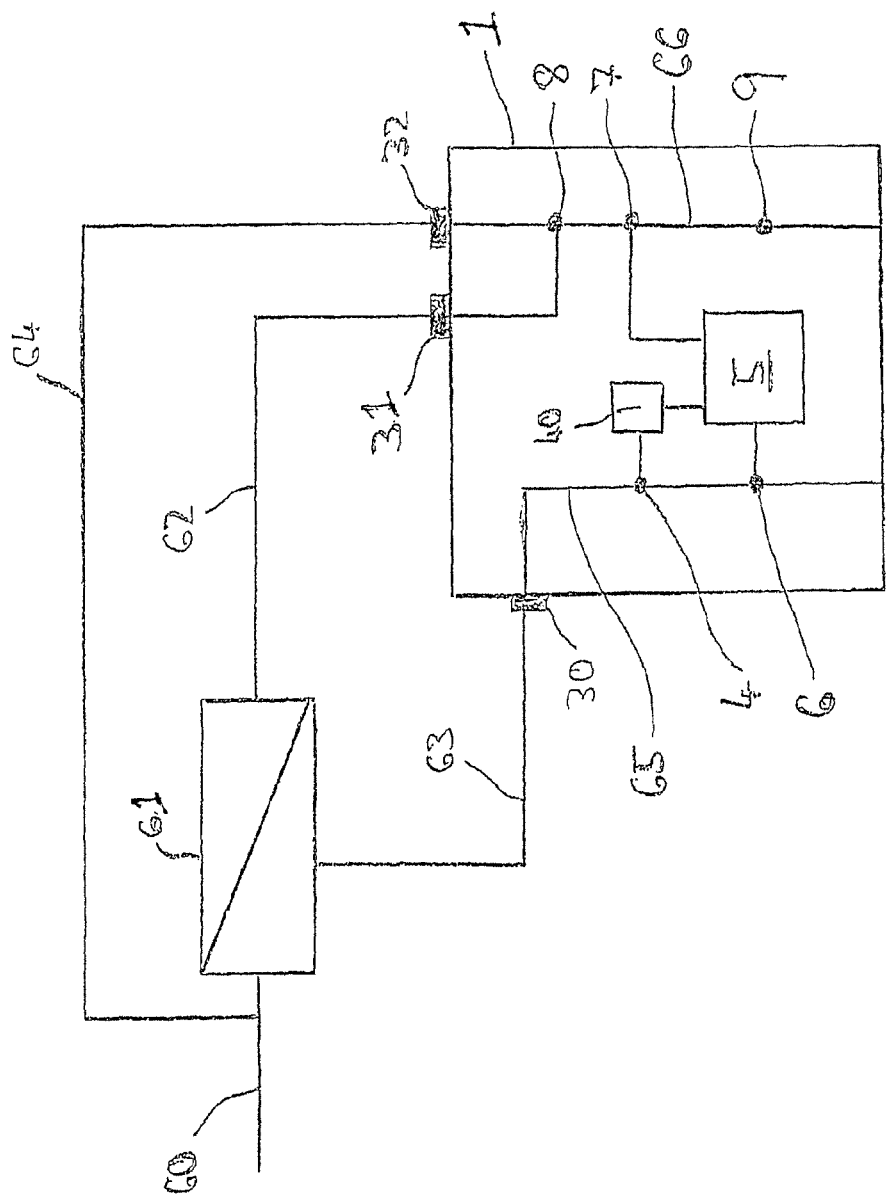
FIG. 3 shows the device according to FIGS. 1 and 2 in a schematic flow diagram form.

In an exploded view, FIG. 1 schematically shows an example of a device 1 that operates a membrane separation device (not shown). Device 1 comprises a base body 2. FIG. 2 shows the base body 2 according to FIG. 1 in a plan view. The base body 2 is produced, for example, of plastic and is also referred to as plastic block. FIG. 3 shows the device 1 from FIGS. 1 and 2 in a schematic flow diagram form.

In the membrane separation device, a supply liquid 60 is separated into a permeate and a concentrate. The base body 2 shown comprises two channels integrated therein and are not visible in FIGS. 1 and 2. To a first channel 65, a concentrate stream 63, also referred to as effluent water stream, can be connected by a fitting 30. To the second channel 66, a permeate stream 62 and a supply liquid 64 of the membrane separation device 61, which is shown in FIG. 3, can be connected by fittings 31, 32.

In the first channel 65, through which a concentrate flows during operation, an actuable element 4 is arranged, the actuable element 4 having an assigned actuator 40, for example, a servomotor. The actuable element 4 is a needle valve as shown. To drive the actuable element 4, the actuable element 4 is mechanically coupled to the actuator 40 by gears 41, 42. A control parameter of the actuable element 4 such as a stroke, an opening, a turn or the like can be altered by the actuator 40. By the actuator 40 and the actuable element 4, a change of the opening degree of the first channel and, thus, a variation of the flow rate through the channel is effected.

The control signal for the actuator 40 is calculated or determined by a controller unit 5. Calculation or determination of the control signal is achieved by a closed-loop control.

To this end, a first sensor device 6 is arranged in the first channel 65 through which a concentrate flows during operation, by which sensor device an actual value of the flow rate of the concentrate, in particular a volumetric flow rate of the concentrate, can be measured. The value detected by the sensor device 6 is transferred to the controller unit 5.

Furthermore, a second sensor device 7 is arranged in the second channel 65 through which a permeate flows during operation, by means of which sensor device 7 an actual value of the flow rate of the permeate, in particular a volumetric flow rate of the permeate, can be measured. The detected signal can also be transmitted to the controller unit 5.

Depending on a preset flow rate ratio between permeate and concentrate, also referred to as permeate recovery rate, as well as the measured actual values of the flow rates of the permeate and of the concentrate, in the controller device 5, the control signal for the actuator 40 is generated and the volumetric flow rate of the concentrate is varied to achieve the predefined permeate recovery rate. The permeate recovery rate depends on various influencing variables such as, for example, age-related changes of permeability of membranes used, pressure fluctuations, temperature fluctuations and/or concentration fluctuations of the supply liquid. With the closed-loop control described above, regulation of the permeate recovery rate to a preset value is possible without knowledge of the values of influencing variables and/or with varying influencing variables. In case a regulation to the preset value is technically not feasible, the permeate recovery rate is controlled in one example to minimize the difference between the preset value and the actual value.

The device 1 may comprise a user interface not shown, on which a desired value for the permeate recovery rate, a desired value for the volumetric flow rate of the permeate and/or a desired value for a mass flow rate of the permeate can be preset.

A function of blending the permeate with a supply liquid 60, in particular with a feed water, is integrated in the device 1 shown. The permeate and the supply liquid connect to the second channel 66 by the two fittings 31, 32 via in each case one check valve 37. Furthermore, a mixing valve 8 is provided in the second channel 66, by which an amount of the supply liquid admixed to the permeate can be adjusted. The mixing valve 8 is configured as mixing valve which can be manually adjusted from the outside. An automatic adjustment may be realized.

The device shown 1 further comprises a sensor device 9 configured as conductivity measuring cell to measure ion concentration. The ion concentration of the "mixed water," i.e., of the mix of supply liquid and permeate is measured with the sensor device 9 and, for example, is displayed on a display of the device 1 not shown.

Furthermore, the shown device 1 comprises two pressure sensor devices 10, 11 that monitors the pressure of the permeate and the supply liquid and for pressure-dependent switching-on or switching-off of the membrane separation device.

FIG. 2 shows the base body 2 according to FIG. 1 in a plan view. The base body 2 comprises, on the upper side shown, two recesses 204, 240 for the control element 4 and for the actuator 40 according to FIG. 1, two recesses 231, 232 for the fittings 31, 32 according to FIG. 1, and one recess 209 for the sensor device 9.

The design of the base body 2 is particularly advantageous in view of the compactness thereof. However, in other examples, other shapes are provided in which, for example, the channels run parallel to one another.

Although the apparatus and methods have been described in connection with specific forms thereof, it will be appreciated that a wide variety of equivalents may be substituted for the specified elements described herein without departing from the spirit and scope of this disclosure as described in the appended claims.

The invention claimed is:

1. A device for operating a membrane separation device in a continuous flow process, wherein, in the membrane separation device a supply liquid can be separated into a concentrate stream and a permeate stream, a flow rate of the permeate stream and a recovery rate of the permeate stream being influenced by at least one influencing variable that varies during operation, comprising:
    a cube-shaped base body having a first channel adapted to receive a flow of the concentrate stream therethrough, and a second channel adapted to receive a flow of the permeate stream therethrough, and
    a first sensor arranged in the first channel which measures an actual value of a flow rate of the concentrate stream, and
    a second sensor arranged in the second channel which measures an actual value of the flow rate of the permeate stream, and
    a mixing valve which blends the permeate stream with the supply liquid, and
    a third sensor provided in at least one of the first channel and the second channel which measures an ion concentration of the blended permeate/supply liquid stream, and
    a control device, wherein, to compensate for a change of the at least one influencing variable, the control device comprises a controller unit that generates a control signal that varies a flow rate of the concentrate stream to control at least one of the flow rate and the recovery rate of the permeate stream to a preset value.

2. The device for operating a membrane separation device according to claim 1, further comprising an actuable element actuated by a control signal that varies the concentrate stream in the at least one first channel.

3. The device for operating a membrane separation device according to claim 1, wherein the second channel comprises a first connection for the permeate, a second connection for the supply liquid and the mixing valve.

4. The device for operating a membrane separation device according to claim 1, further comprising at least one pressure sensor device that detects a pressure for switching-on or switching-off the membrane separation device in a pressure-dependent manner is provided in at least one of the first channel and the second channel.

5. The device for operating a membrane separation device according to claim 1, further comprising at least one user interface for entry of preset values regarding the permeate stream.

6. The device for operating a membrane separation device according to claim 1, further comprising at least one user interface for display of actual values regarding a least one of the concentrate stream and the permeate stream.

7. The device for operating a membrane separation device according to claim 2, wherein the actuable element is an actuable valve.

8. A device for operating a membrane separation device in a continuous flow process, wherein, in the membrane separation device a supply liquid can be separated into a concentrate stream and a permeate stream, a flow rate of the permeate stream and a recovery rate of the permeate stream being influenced by at least one influencing variable that varies during operation, comprising:

a cube-shaped base body having a first channel adapted to receive a flow of the concentrate stream therethrough, and a second channel adapted to receive a flow of the permeate stream therethrough, and a first sensor arranged in the first channel which measures an actual value of a flow rate of the concentrate stream, and a second sensor arranged in the second channel which measures an actual value of the flow rate of the permeate stream, and a mixing valve which blends the permeate stream with the supply liquid, and a third sensor provided in at least one of the first channel and the second channel which measures an ion concentration of the blended permeate/supply liquid stream, and a control device integrated into the cube-shaped base body, wherein, to compensate for a change of the at least one influencing variable, the control device comprises a controller unit that generates a control signal that varies a flow rate of the concentrate stream to control at least one of the flow rate and the recovery rate of the permeate stream to a preset value.

\* \* \* \* \*